US007511278B2

(12) United States Patent

Scheidemann et al.

(10) Patent No.: US 7,511,278 B2

(45) Date of Patent: Mar. 31, 2009

(54) APPARATUS FOR DETECTING PARTICLES

(75) Inventors: Adi A. Scheidemann, Baden (CH); Dirk Ardelt, Krefeld (DE); M. Bonner Denton, Tucson, AZ (US)

(73) Assignee: Spectro Analytical Instruments GmbH & Co. KG (DE)

( * ) Notice: Subject to any disclaimer, the term of this patent is extended or adjusted under 35 U.S.C. 154(b) by 129 days.

(21) Appl. No.: 11/343,273

(22) Filed: Jan. 30, 2006

(65) Prior Publication Data

US 2007/0176089 A1 Aug. 2, 2007

(51) Int. Cl.
*G01T 1/00* (2006.01)

(52) U.S. Cl. ............... 250/397; 250/336.1; 250/339.02; 250/369; 250/265; 250/266; 250/299

(58) Field of Classification Search ................ 250/299, 250/336.1, 339.02, 369, 265, 266, 397
See application file for complete search history.

(56) References Cited

U.S. PATENT DOCUMENTS

| | | | | | |
|---|---|---|---|---|---|
| 5,354,980 | A | * | 10/1994 | Rappoport et al. | 250/208.1 |
| 5,394,237 | A | * | 2/1995 | Chang et al. | 356/328 |
| 6,180,942 | B1 | * | 1/2001 | Tracy et al. | 250/299 |
| 6,847,036 | B1 | * | 1/2005 | Darling et al. | 250/291 |
| 7,145,134 | B2 | * | 12/2006 | Gonin et al. | 250/287 |
| 7,282,709 | B2 | * | 10/2007 | Darling et al. | 250/299 |
| 2004/0262533 | A1 | * | 12/2004 | Krueger | 250/397 |

* cited by examiner

*Primary Examiner*—Jack I Berman
*Assistant Examiner*—Michael Maskell
(74) *Attorney, Agent, or Firm*—Robert W. Becker; Robert Becker & Assoc

(57) ABSTRACT

An apparatus for detecting particles, comprising a plurality of electrically conductive structures disposed on a support element. The structures are electrically insulated from one another and each structure can be electrically connected to an electronic read-out device. The structures receive a beam of particles in a direction forming an angle of incidence with the support element. A trough is disposed between each two successive structures as viewed in the beam direction. And at least partial overlap exists between each two successive structures. The apparatus can be disposed in the focal plane of a mass spectrometer.

20 Claims, 1 Drawing Sheet

APPARATUS FOR DETECTING PARTICLES

BACKGROUND OF THE INVENTION

The present invention relates to a device for detecting particles and to a mass spectrometer.

It is known to detect particles by means of spatially resolved detectors which comprise a number of contacted elements on which the particles directly strike and can be electrically detected. In this case the particles may either be charged particles which directly generate an electrical signal owing to their charge, or protons or other uncharged particles which bring about an electrical signal as a result of appropriate interaction with an existing element coating.

US 2004/0222374 A1 describes a spatially resolved detector in which a large number of strip-like, conductive elements is arranged side by side in one plane. The elements are separately contacted by an electronic read-out device. The surfaces of the elements are all located in one plane, wherein gaps of non-contacted material remain between the elements. Particles which strike these gaps cannot be detected as the gaps do not constitute an active detector surface.

U.S. Pat. No. 6,847,036 B1 describes a spatially resolved detector for charged particles which comprises a large number of Faraday cups arranged side by side. The cups each have an electrical contact via which they can be selectably connected by way of a multiplexer circuit to an operational amplifier. During a measuring process impacting charged particles, for example from a mass spectrometer, are collected (integrated) in the Faraday cups until the respective cup is connected via the multiplexer circuit and read out.

The object of the invention is to provide a device for detecting particles which has high detection efficiency and can be easily produced. A further object of the invention is to provide a mass spectrometer with an improved device for detecting particles.

SUMMARY OF THE INVENTION

According to the invention this object is realized by an apparatus for detecting particles that comprises a plurality of electrically conductive structures disposed on a support element, wherein these structures are electrically insulated from one another and each structure is adapted to be electrically connected to an electronic read-out device, wherein the structures are adapted to receive a beam of particles having a direction that forms an angle of incidence relative to the support element, wherein a trough is disposed between each two successive structures as viewed in the beam direction, and wherein at least partial overlap exists between each two successive structures in the beam direction.

Separation of the adjacent structures by a trough and their geometrical overlapping ensures that the particle beam strikes a detector, the surface of which is fully suited to particle detection, wherein resolution according to the location of the particle beam is also provided.

In a preferred embodiment an aspect ratio is defined by a ratio of a height of the structures to a width of the trough. In this case the aspect ratio is preferably at least 0.5, particularly preferably at least 1 and more preferably at least 5. A high aspect ratio on the one hand allows a relatively flat angle of incidence of the particle beam with complete detection or spatial covering and, on the other hand, a high aspect ratio leads to only a relatively small contact area of the conductive structure with the support element being provided, and this basically leads to low capacitances between structure and support element. In addition, the difference in the capacitances of the structures is reduced hereby, and this leads to particularly good adaptability of the electronic read-out device to the conductive structures. In particular the various structures have high uniformity with respect to their read-out characteristics hereby.

The structures are generally preferably substantially uniformly and equally spaced apart, wherein a spatial periodicity of the structures is given in at least one direction. In a large number of applications uniformity of the individual structures is required as the detection property of the detector surface should be homogeneous. In principle there can, however, also be a non-periodicity of at least some structures, depending on the particular requirements. A period length of the structures is particularly preferably not more than about 500 micrometers, more preferably not more than about 100 micrometers and even more preferably not more than 20 micrometers. Good spatial resolution may be achieved as a result of the appropriately small size of the structures. In addition, with a given number of separate structures, the detector can be configured so as to have a small overall construction, whereby miniaturization of one of the analyzers containing the detector is assisted. The apparatus according to the invention particularly preferably has an overall length of the plurality of structures in the direction of the spatial periodicity of not more than about 15 cm, in particular not more than about 10 cm. The apparatus according to the invention can advantageously then be particularly well combined in conjunction with a mass spectrometer. In principle, and depending on the requirements, a periodicity of the structures in two spatial directions is also possible, for instance analogous to the two-dimensional Faraday cup arrangement in FIG. 2b of U.S. Pat. No. 6,847,036 B1.

In a preferred embodiment the structures are formed as elongated elements having a substantially rectangular cross-section. A cross-section of this kind can be particularly easily produced by known microstructuring processes. Alternatively the structures can also have a different cross-section. Adaptation to the characteristics of the particle beam can take place hereby.

In a particularly preferred embodiment the structures have a surface which is oriented substantially perpendicularly to the beam direction. In this way the variation in the flight time of the various particles over the region of the surface of a structure may be minimized. In particular the overall detector surface can hereby be constructed such that simultaneous striking of all particle beams on one of the respective structures is made possible. The detection efficiency may also be increased as a result of the perpendicular incidence.

The electronic read-out device generally preferably comprises at least one capacitive transimpedance amplifier (CTIA). Amplifiers of this type have proved to be particularly sensitive for reading out small charge quantities. The capacitive transimpedance amplifier particularly preferably has a plurality of different switchable integration capacitors in this case, whereby the detection limit may be increased. Variable transimpedance amplifiers of this type have recently been developed for use with particle detectors—see for example "Array Detectors Impact Modern Chemical Analysis; M. Bonner Denton, University of Arizona, Department of Chemistry, Gary Hieftje, Indiana University, David Kopenaal, PNNL, Bruce McIntosh, Hamilton Sundstrand, Peter Williams, Arizona State University, USA, presented at the 2003 ICSOI in Cozumel, MX, " and "Advanced Ion Detectors for Ion Mobility Spectrometry; Roger Sperline, University of Arizona, Department of Chemistry, Chris Gresham, Phil Rodacy, Sandia National Laboratories, USA, presented at the 2003 ICSOI in Cozumel, MX,".

In a generally preferred embodiment the structures are produced by means of a microprocessing process, in particular a LIGA process. LIGA processes allow large aspect ratios of the structures with relatively simple and inexpensive production.

The object of the invention is realized according to the invention by a mass spectrometer having a focal plane in which is disposed the inventive apparatus, wherein different locations in the focal plane are associated with the trajectories of particles having different masses. The apparatus according to the invention for detecting particles is particularly preferably suitable for combination with a mass spectrometer of this type. Mass spectrometers provide the disconnected information as charged particles which can be directly detected in sufficient sensitivity by means of modern, highly sensitive, evaluating electronic devices, so the detector according to the invention can optionally be used without further amplifiers, such as multi-channel plates (MCP), connected upstream. The mass spectrometer is particularly preferably a double focusing spectrometer, in particular of the Mattauch-Herzog type. With spectrometers of this type there is usually a focal plane which is not oriented perpendicularly to the particle beam. Therefore the detector according to the invention is particularly advantageously suitable for combination with a spectrometer of this type owing to the required oblique beam incidence.

Further advantages and features of the apparatus according to the invention can be found in the embodiments described hereinafter and in the dependent claims.

BRIEF DESCRIPTION OF THE DRAWINGS

Two preferred embodiments of an apparatus according to the invention for detecting particles will be described hereinafter and explained in more detail with reference to the accompanying drawings, in which.

DESCRIPTION OF SPECIFIC EMBODIMENTS

Figure 1:
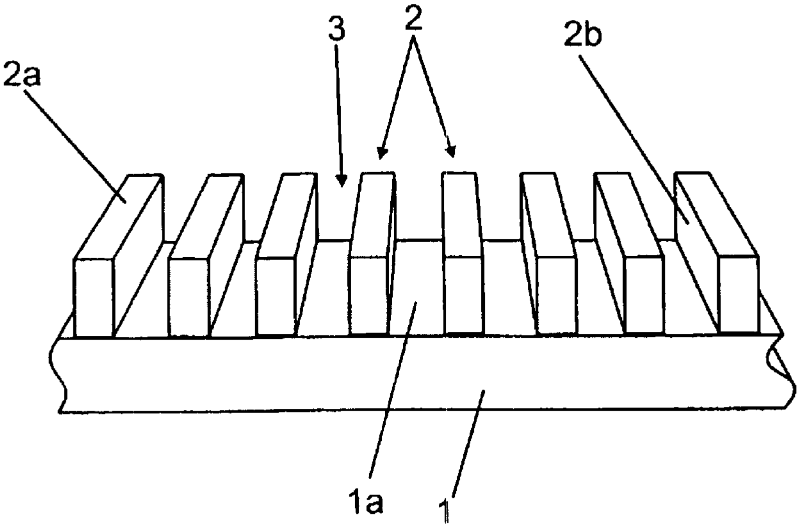
FIG. 1 shows a three-dimensional schematic view of a detail of an apparatus for detecting particles according to a first embodiment.

FIG. 1 shows an apparatus for detecting particles which comprises a support element 1 with a surface 1*a* extending in one plane. The support element 1 can, in particular, consist of an insulating material. A plurality of elongated structures 2 which consist of a conductive material are located on the support element 1. The structures 2 are electrically insulated with respect to the support element 1. The insulation is provided either in that the support element 1 is insulating as a whole or by an insulating layer (not shown) located between the structures 2 and the support element 1.

In the present case the structures 2 are prisms with a rectangular cross-section and are uniform in each case. They each have a length l and a height h. A trough 3, which is not filled with material and has a width b, is located between two of the structures 2 in each case.

Each of the structures 2 is separately electrically connected to an electronic read-out device (not shown). The electrical connection can be produced in any manner known per se. For example separate metallic wires may be provided which in particular are embedded in a protective resin. An integrated contact may also be provided, for example by means of vias, which are formed in the support element 1.

Figure 2:
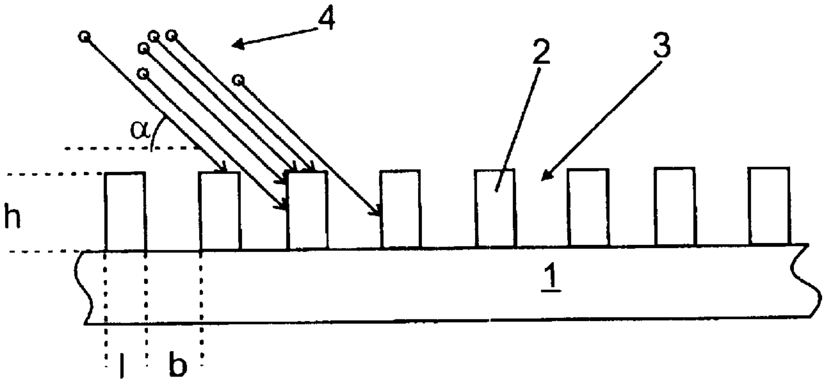
FIG. 2 shows a plan view from the front of the apparatus in FIG. 1.

As the schematic plan view of FIG. 2 shows, in the present example the charged particles 4 to be registered, in particular ions from a mass spectrometer, strike at an angle of 45 degrees with respect to the plane 1*a* of the support element 1. Owing to the respective trough with width b arranged between two structures 2, there is geometrical overlapping of respectively adjacent structures 2 from the direction of the striking particles. Thus each of the particles either strikes an upper face 2*a* or a lateral wall 2*b* of the structures 2. Each of the particles 4 from the particle beam thus reaches an electrically conductive face contacted by the electronic read-out device. The spatial beam covering by the detector ("fill factor") is thus 100%.

In an arrangement according to the first embodiment the condition for the existence of 100% spatial covering is:

$$h/b > \tan\alpha$$

where α is the beam angle between the plane 1*a* and the particle beams.

In the present example the device has a total extension in the beam direction of about 10 cm, wherein only a small detail is shown. With a period length of the structures of 1+b=0.1 mm a total of about 1,000 structures 2 and therefore 1,000 spatially separate read-out channels would result for simultaneously registering a spectrum. Depending on the resolution of the spectrometer and further requirements with respect to the production costs, detectors with 10,000 channels and more may also be readily provided. The width of the structure perpendicular to the beam direction (perpendicular to the drawing plane according to FIG. 2) is in the present case about 0.2 cm to 1 cm. Overall the detector at hand is thus particularly well suited for use in a high-resolution Mattauch-Herzog mass spectrometer.

Figure 3:
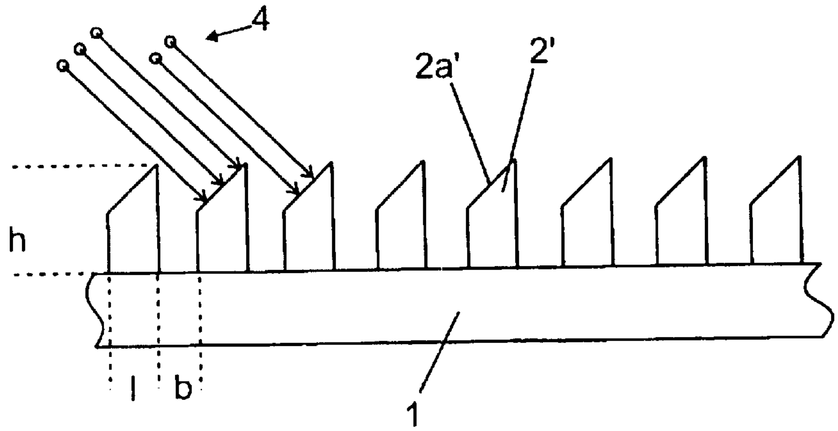
FIG. 3 shows a second preferred embodiment in a plan view from the front.

FIG. 3 shows a second preferred embodiment. The cross-sectional form of the structures 2' differs from the structures 2 of the first embodiment here. The structures no longer have a rectangular cross-section but in the upper region have an end face 2*a*' which is inclined by 45 degrees with respect to the support element 1. At a beam angle of 45 degrees the particles 4 thus strike one of the respective end faces 2*a*' perpendicularly. At least all of the particles which strike a specific structure element 2' are given approximately the same flight time hereby. Advantages can result hereby depending on the requirement. A further advantage of perpendicular impact consists in higher detection efficiency compared with a grazing incidence as the activation cross-section for reflection of the particles is lower.

In principle any desired combination of cross-sectional form, orientation of faces of the structures and beam angle are possible, wherein a spatial covering of adjacent structures expediently exists to achieve 100% beam covering.

The present invention is, of course, in no way restricted to the specific disclosure of the specification and drawings, but also encompasses any modifications within the scope of the appended claims.

The invention claimed is:

1. An apparatus for detecting particles, comprising:

a support element (1), and a plurality of electrically conductive structures (2, 2') disposed on said support element (1), wherein said structures are electrically insulated from one another, wherein each of said structures (2, 2') is adapted to be electrically connected to an electronic read-out device, wherein said structures are adapted to receive a beam of particles having a direction which forms an angle of incidence ($\alpha$) relative to said support element (1), wherein a trough (3) is disposed between each two successive structures (2, 2') as viewed in the beam direction, wherein an at least partial overlap exists between each two successive structures in the beam direction, wherein an aspect ratio of a height (h) of said structures (2, 2') to a width (b) of said trough (3) is at least 0.5, and wherein the aspect ratio is $h/b>\tan \alpha$.

2. An apparatus according to claim 1, wherein said aspect ratio is at least 1.

3. An apparatus according to claim 1, wherein said aspect ratio is at least 5.

4. An apparatus according to claim 1, wherein said structures (2, 2') are spaced apart essentially uniformly and equally, and wherein a spatial periodicity of said structures (2, 2') is provided in at least one direction.

5. An apparatus according to claim 4, wherein said structures (2, 2') have a period length of not more than approximately 500 micrometers.

6. An apparatus according to claim 5, wherein said period length is not more than approximately 100 micrometers.

7. An apparatus according to claim 6, wherein said period length is not more than approximately 20 micrometers.

8. An apparatus according to claim 4, wherein the overall length of said plurality of structures (2, 2') in a direction of said spatial periodicity is no more than approximately 15 centimeters.

9. An apparatus according to claim 8, wherein said overall length is not more than approximately 10 centimeters.

10. An apparatus according to claim 1, wherein said structures (2) are formed as elongated elements having a substantially rectangular cross-section.

11. An apparatus according to claim 1, wherein said structures (2') have a surface that is oriented substantially perpendicular to the beam direction.

12. An apparatus according to claim 1, wherein the electronic read-out device includes at least one capacitive transimpedence amplifier (CTIA).

13. An apparatus according to claim 12, wherein said at least one capacitive transimpedence amplifier is provided with a plurality of different switchable integration capacitors.

14. An apparatus according to claim 1, wherein said structures (2, 2') are adapted to be produced by means of a microprocessing process.

15. An apparatus according to claim 1, wherein said structures (2, 2') have a periodicity in two spatial directions.

16. An apparatus according to claim 1, wherein said apparatus is disposed in a focal plane of a mass spectrometer, and wherein different locations in the focal plane are associated with trajectories of particles having different masses.

17. An apparatus according to claim 16, wherein the mass spectrometer is a double focusing spectrometer.

18. An apparatus according to claim 17, wherein said double focusing spectrometer is of a Mattauch-Herzog type.

19. An apparatus according to claim 1, wherein said structures (2, 2') are adapted to be produced by means of an LIGA process.

20. A mass spectrometer, comprising:

an apparatus for detecting particles, said apparatus comprising a support element (1)'and a plurality of electrically conductive structures (2, 2') disposed on said support element (1), wherein said structures are electrically insulated from one another, wherein each of said structures (2, 2') is adapted to be electrically connected to an electronic read-out device, wherein said structures are adapted to receive a beam of particles having a direction which forms an angle of incidence ($\alpha$) relative to said support element (1), wherein a trough (3) is disposed between each two successive structures (2, 2') as viewed in the beam direction, wherein an at least partial overlap exists between each two successive structures in the beam direction, wherein an aspect ratio of a height (h) of said structures (2, 2') to a width (b) of said trough (3) is at least 0.5, and wherein the aspect ratio is $h/b>\tan \alpha$.

* * * * *